(12) United States Patent  
Fu et al.

(10) Patent No.: US 9,077,418 B2
(45) Date of Patent: Jul. 7, 2015

(54) METHOD FOR CONTROLLING RECEIVING DIVERSITY OF A RECEIVER AND A MOBILE STATION

(75) Inventors: Yanzeng Fu, Xi'an (CN); Hong Zhang, Xi'an (CN); Xiaofeng Wu, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 13/976,784

(22) PCT Filed: Jan. 21, 2012

(86) PCT No.: PCT/CN2012/000116
§ 371 (c)(1),
(2), (4) Date: Oct. 1, 2013

(87) PCT Pub. No.: WO2013/106950
PCT Pub. Date: Jul. 25, 2013

(65) Prior Publication Data
US 2014/0016685 A1    Jan. 16, 2014

(51) Int. Cl.
*H04L 1/02*    (2006.01)
*H04B 7/08*    (2006.01)

(52) U.S. Cl.
CPC .............. *H04B 7/0808* (2013.01); *H04B 7/082* (2013.01)

(58) Field of Classification Search
USPC ......... 375/141, 147, 219, 220, 267, 340, 346, 375/347, 349; 343/700 R, 703, 777, 876, 343/893
See application file for complete search history.

(56) References Cited

U.S. PATENT DOCUMENTS

| | | | | |
|---|---|---|---|---|
| 5,799,042 | A  * | 8/1998 | Xiao ............................. | 375/285 |
| 2006/0245525 | A1 * | 11/2006 | Cho .............................. | 375/340 |
| 2008/0291113 | A1 * | 11/2008 | Ou-Yang ...................... | 343/876 |
| 2009/0267842 | A1 * | 10/2009 | Takagi et al. ................. | 343/702 |
| 2010/0172429 | A1 * | 7/2010 | Nagahama et al. ........... | 375/267 |

FOREIGN PATENT DOCUMENTS

| | | |
|---|---|---|
| CN | 101795151 | 8/2010 |
| EP | 2009812 | 12/2008 |
| WO | WO 2010/129610 | 11/2010 |

OTHER PUBLICATIONS

International Search Report issued for PCT/CN2010/000116 date of mailing Oct. 25, 2012.

* cited by examiner

*Primary Examiner* — Dac Ha
(74) *Attorney, Agent, or Firm* — Schiff Hardin LLP

(57) ABSTRACT

A method for controlling receiving diversity of a receiver and a mobile station are provided. The method comprises determining single antenna receiving quality indicators for all activated antennas if a receiver receiving quality indicator of the receiver is above a first threshold, and deactivating all the activated antennas except one activated antenna with a single antenna receiving quality indicator indicating best receiving quality based on the determined single antenna receiving quality indicators.

20 Claims, 4 Drawing Sheets

METHOD FOR CONTROLLING RECEIVING DIVERSITY OF A RECEIVER AND A MOBILE STATION

TECHNICAL FIELD

Aspects of the present disclosure relate to wireless communications and, in particular, relate to receiving diversity of a receiver of a mobile station in wireless communications.

BACKGROUND OF THE INVENTION

In telecommunications, a diversity scheme improves quality and reliability of a signal by using two or more communication channels with different characteristics. Diversity plays an important role in combating fading and co-channel interference and avoiding error bursts. It is based on the fact that individual channels experience different levels of fading and interference. Multiple versions of the same signal may be transmitted and/or received and combined in the receiver.

Antenna diversity, also known as space diversity, is a wireless diversity scheme that uses two or more antennas to improve quality and reliability of a signal. In a receiver of a mobile station, receiving diversity by means of two or more antennas is used to offer a possibility of enhanced channel diversity and improve receiving quality of the mobile station.

However, there are at least two problems in using the receiving diversity. Firstly, the receiving diversity increases power consumption. Secondly, in some scenarios where attenuation of different antenna paths may be very high, the receiving diversity degrades performance.

One method to address the problem of power consumption increase is to include in a receiver of a mobile station a main antenna and a diversity antenna. The diversity antenna is turned on or off dynamically by using one or more receiving quality indicators, such as a Signal-to-Noise Ration (SNR), a Bit Error Ratio (BER), a Received Signal Strength Indicator (RSSI), in order to reduce power consumption while maintaining receiving quality at a certain level.

When the receiving quality is below a lower threshold, the diversity antenna is turned on to improve performance. When the receiving quality is above an upper threshold, the diversity antenna is turned off to save power.

However, this method fails to turn on or off the main antenna dynamically. This will become problematic in some situations. Furthermore, this method can not avoid performance degradation due to the receiving diversity.

SUMMARY OF THE INVENTION

In order to obviate or mitigate at least some of the above disadvantages, a method for controlling receiving diversity of a receiver of a mobile station in wireless communications is provided.

According to one aspect of the present disclosure, there is provided a method for controlling receiving diversity of a receiver. The method comprises determining single antenna receiving quality indicators for all activated antennas if a receiver receiving quality indicator of the receiver is above a first threshold, and deactivating all the activated antennas except one activated antenna with a single antenna receiving quality indicator indicating best receiving quality based on the determined single antenna receiving quality indicators.

According to another aspect of the present disclosure, there is provided a mobile station. The mobile station comprises a receiver comprising a signal combiner and a plurality of antennas, and a processing unit. The processing unit is configured to control receiving diversity of the receiver by determining single antenna receiving quality indicators for all activated antennas, if a receiver receiving quality indicator of the receiver is above a first threshold, and deactivating all the activated antennas except one activated antenna with a single antenna receiving quality indicator indicating a best receiving quality based on the determined single antenna receiving quality indicators.

BRIEF DESCRIPTION OF THE DRAWINGS

Aspects of the present disclosure will be understood more fully from the detailed description given below and from the accompanying drawings of various embodiments of the invention, which, however, should not be taken to limit the invention to the specific embodiments, but are for explanation and understanding only.

DETAILED DESCRIPTION

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Throughout the description and claims, the terminology "mobile station" includes, but is not limited to, a mobile station, a mobile subscriber unit, a mobile TV client, a pager, a cellular telephone, a Personal Digital Assistant (PDA), a smart phone, a text messaging device, a network interface card, a notebook computer, or any other type of mobile device capable of operating in a wireless environment.

Figure 1:
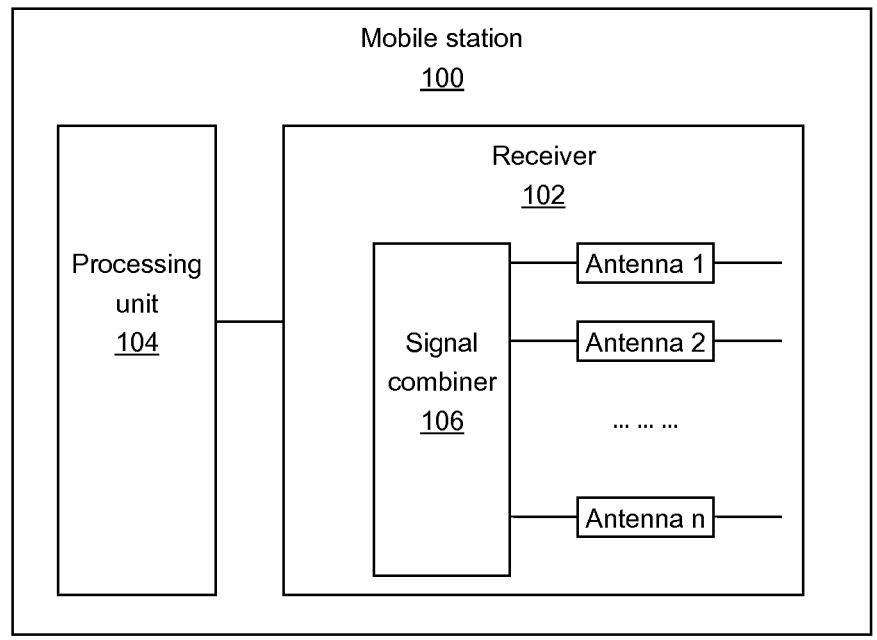
FIG. 1 is a schematic block diagram of a mobile station comprising a receiver in accordance with one aspect of the present disclosure.

FIG. 1 is a schematic block diagram of a mobile station 100 in which one aspect of the present disclosure is implemented. The mobile station 100 comprises a receiver 102 and a processing unit 104. The receiver 102 comprises a plurality of antennas, for example, antenna 1, antenna 2, . . . , antenna n, where n is a positive integer and n≥2. Each antenna may receive a signal from outside the mobile station 100, and the quality of the received signal is referred to as single antenna receiving quality of the antenna in the present disclosure. The plurality of antennas may be physical antennas or virtual antennas. Two or more of the plurality of antennas form receiving diversity of the receiver 102 so as to improve signal receiving quality of the receiver 102. The receiver 102 also includes a signal combiner 106 that combines signals from one or more of antennas 1 to n as a resultant signal for the receiver 102. The quality of the resultant signal is referred to as receiver receiving quality of the receiver 102 in the present disclosure.

The processing unit 104 is generally used for controlling operations of various components in the receiver 102. In particular, the processing unit 104 controls receiving diversity of antennas 1 to n of the receiver 102 to improve performance. It should be understood that the processing unit 104 may comprise hardware, firmware, software, or any combination thereof. In at least one embodiment, the processing unit 104 includes one general or special purpose microprocessor and/or digital signal processor that are programmed to carry out operations corresponding to the method steps as discussed below. Such instructions may be embodied as computer programs comprising stored program instructions in a storage element (e.g., memory).

Figure 2:
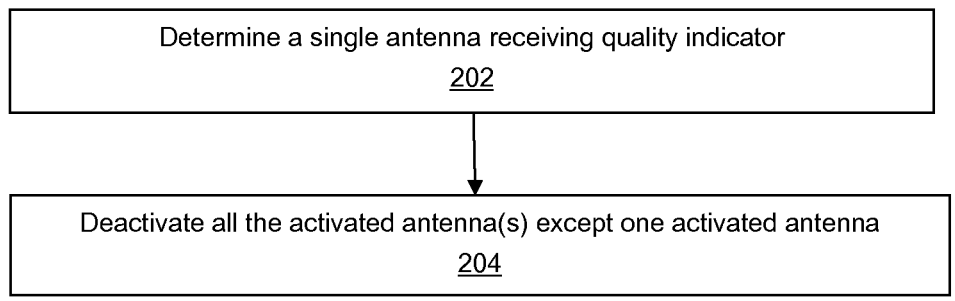
FIG. 2 schematically shows an exemplary flow chart of an exemplary method for controlling receiving diversity of the receiver shown in FIG. 1 in accordance with one aspect of the present disclosure.

Referring to FIG. 2, an exemplary flow chart illustrating a method 200 for controlling receiving diversity of the receiver 102 shown in FIG. 1 is shown in accordance with one aspect of the present disclosure. The method 200 is performed by the processing unit 104.

Two or more of antennas 1 to n are activated in a scenario where the receiving diversity of the receiver 102 is turned on. However, as time goes by, the receiver receiving quality of the receiver 102 may become so good that the receiving diversity is unnecessary in view of power consumption. In this case, the method 200 may be used. The method 200 begins with step 202 in which the processing unit 104 determines single antenna receiving quality indicators indicating single antenna receiving quality for all activated antennas, if the processing unit 104 determines that a receiver receiving quality indicator indicating receiver receiving quality of the receiver 102 is above a first threshold.

The first threshold refers to a threshold of the receiver receiving quality indicator of the receiver 102. The first threshold may vary depending upon a desired implementation. The receiver receiving quality indicator of the receiver 102 being above the first threshold means that the resultant signal of the receiver 102 is good enough in quality, such that it is unnecessary to turn on receiving diversity.

According to an aspect of the present disclosure, the single antenna receiving quality indicator is, for example, an SNR, a RSSI, or a combination thereof for a fading channel, and, for example, an antenna gain for a static channel. The receiver receiving quality indicator is for the resultant signal of the receiver 102, and is, for example, a BER, a BLock Error Ratio (BLER), or a combination thereof.

Then in step 204, the processing unit 104 deactivates all the activated antennas except one activated antenna whose single antenna receiving quality indicator indicates that it has best receiving quality based on the determined single antenna receiving quality indicators.

As an example, it is assumed that antennas 1, 2, 3 are activated in case of the static channel. If the processing unit 104 determines the BER of the resultant signal of the receiver 102 is above the first threshold, the processing unit 104 determines antenna gains of antennas 1, 2, 3. It is assumed that antenna 1>antenna 2>antenna 3 in terms of antenna gain. Then the processing unit 104 deactivates antennas 2 and 3, leaving antenna 1 remain activated.

As a further example, it is assumed that antennas 1, 2, 3 are activated in case of the fading channel. If the processing unit determines the BER of the resultant signal of the receiver 102 is above the first threshold, the processing unit 104 determines SNRs of antennas 1, 2, 3. It is assumed that antenna 1>antenna 2>antenna 3 in terms of SNR. Then the processing unit 104 deactivates antennas 2 and 3, leaving antenna 1 remain activated.

In this way, only the activated antenna with best receiving quality remains activated, and the remaining activated antenna(s) are deactivated. Hence, power consumption may be reduced.

Without turning on or off only the diversity antenna, the method 200 in the present disclosure allows each antenna to be individually and dynamically turned on or off regardless of the main antenna and the diversity antenna, because any of antennas 1 to n may be activated or deactivated. Thus, when receiving diversity is off, it is the better antenna that is always in use.

In a scenario where the receiving diversity of the receiver 102 is turned off, only one of antennas 1 to n is activated. However, as time goes by, the receiver receiving quality of the receiver 102 may become so bad that it is necessary to turn on receiving diversity to improve the quality of the resultant signal. In this case, different methods may be used for the static channel and the fading channel, as described below with respect to FIGS. 3 and 4 respectively.

Figure 3:
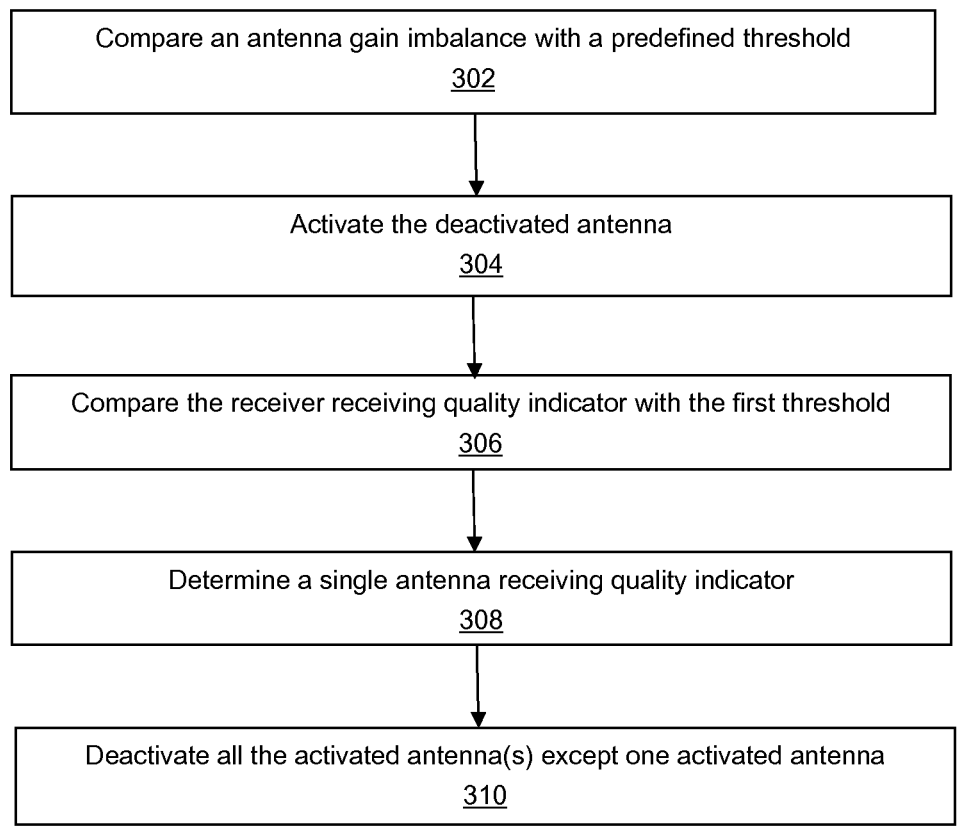
FIG. 3 schematically shows an exemplary flow chart of a method for controlling receiving diversity of the receiver shown in FIG. 1 for a static channel in accordance with one aspect of the present disclosure.

FIG. 3 shows an exemplary flow chart illustrating a method 300 for controlling receiving diversity of the receiver 102 shown in FIG. 1 for the static channel in accordance with one aspect of the present disclosure. The method 300 is performed by the processing unit 104.

In step 302, if the processing unit 104 determines that the receiver receiving quality indicator (such as BER, BLER, or a combination thereof) of the receiver 102 is below a second threshold smaller than the first threshold indicated in the method 200, such as in case of the static channel, the processing unit 104 compares an antenna gain imbalance of a deactivated antenna with a predefined threshold. The antenna gain imbalance comes from an upper layer, such as a data link layer, a network layer, a transport layer, or an application layer. Also the antenna gain imbalance is fixed since the channel is static.

The second threshold, similar to the first threshold, also refers to a threshold of the receiver receiving quality indicator of the receiver 102, but it is smaller than the first threshold. The second threshold may vary depending upon a desired implementation. The first and second thresholds may be selected such that a gap between the first and second thresholds avoids a ping-pong effect. That is, oscillation of the processing unit 104 between turning on the receiver diversity and turning off the receiver diversity is avoided. The receiver receiving quality indicator of the receiver 102 being below the second threshold means that the resultant signal of the receiver 102 is so bad in quality that it is necessary to turn on receiving diversity.

The predefined threshold as mentioned above refers to a threshold of the antenna gain imbalance in the static channel. If the antenna gain imbalance of an antenna exceeds the predefined threshold, the antenna may be seen as a worse antenna which should not be activated. Otherwise, if the antenna gain imbalance of the antenna is smaller than or equal to the predefined threshold, the antenna may be seen as a better antenna which may be activated. The predefined threshold may vary depending upon a desired implementation.

In step 304, if the processing unit 104 determines that the antenna gain imbalance is smaller than or equal to the predefined threshold, the processing unit 104 activates the deactivated antenna to improve receiving quality. If the processing unit 104 determines that the antenna gain imbalance exceeds the predefined threshold, the deactivated antenna remains deactivated. Since activating the deactivated antenna is gated by the antenna gain imbalance comparison, performance degradation due to receiving diversity is avoided.

Further, after the receiving diversity is turned on, in step 306, the processing unit 104 compares the receiver receiving quality indicator (such as BER, BLER, or a combination thereof) with the first threshold indicated in the method 200. If the receiver receiving quality indicator is smaller than or equal to the first threshold, the receiving diversity will be kept on. If the receiver receiving quality indicator is above the first threshold, the processing unit 104 determines in step 308 single antenna receiving quality indicators (such as an antenna gain) for all the activated antennas and deactivates in step 310 all the activated antennas except one activated antenna whose single antenna receiving quality indicator indicates that it has best receiving quality based on the determined single antenna receiving quality indicators. Steps 308 and 310, similar to steps 202 and 204, will keep only the best antenna on to save power.

For the fading channel, the antenna gain imbalance is changing from burst to burst. So unlike the static channel, a predefined threshold may not be used to activate or deactivate the worse antenna dynamically.

Figure 4:
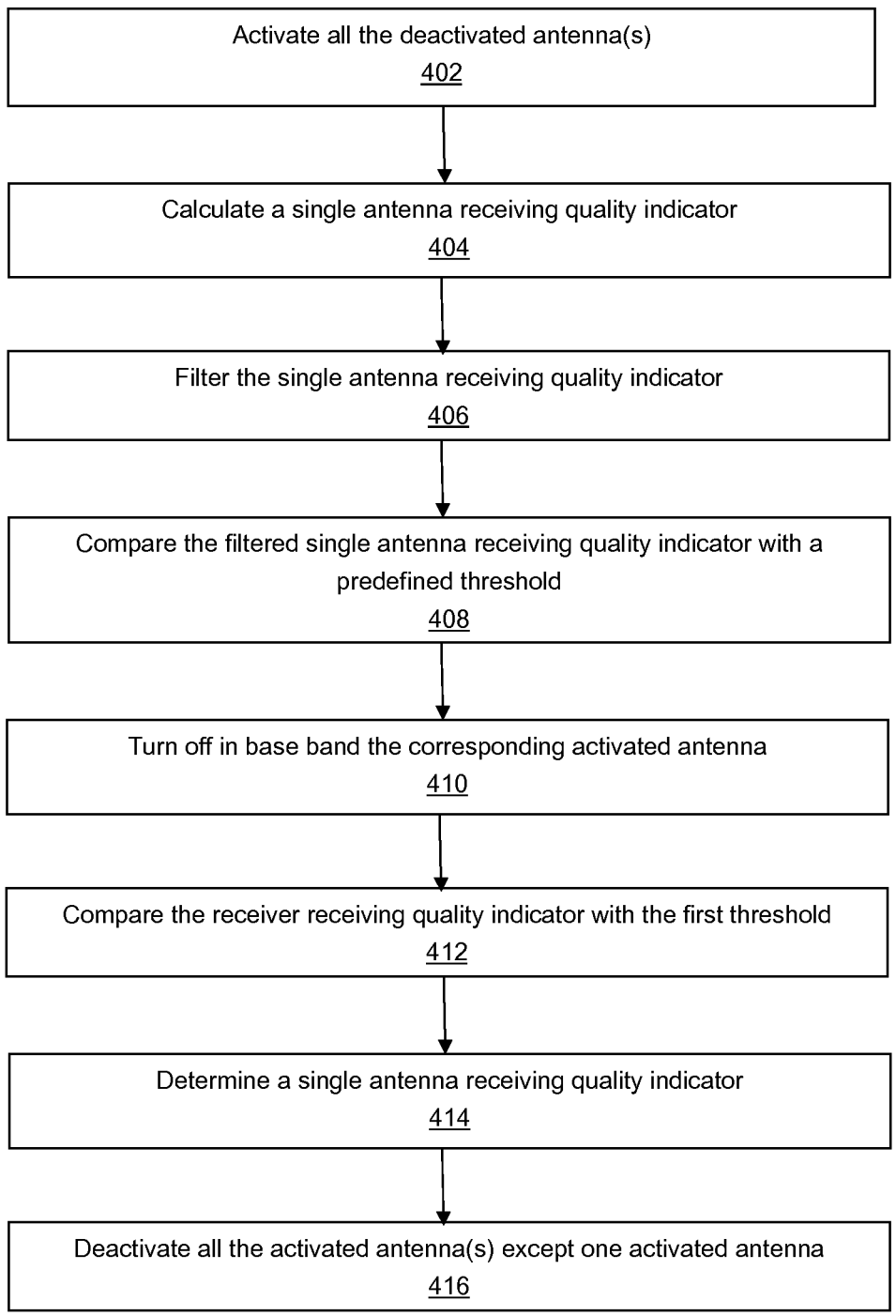
FIG. 4 schematically shows an exemplary flow chart of a method for controlling receiving diversity of the receiver shown in FIG. 1 for a fading channel in accordance with one aspect of the present disclosure.

FIG. 4 shows an exemplary flow chart illustrating a method 400 for controlling receiving diversity of the receiver 102 shown in FIG. 1 for the fading channel in accordance with one aspect of the present disclosure. The method 400 is performed by the processing unit 104.

In step 402, if the processing unit 104 determines that the receiver receiving quality indicator (such as BER, BLER, or a combination thereof) is below the second threshold indicated in the method 300, for example, in case of the fading channel, the processing unit 104 activates all the deactivated antennas.

For any activated antenna, steps 404-410 are performed. Specifically, in step 404, the processing unit 104 calculates a single antenna receiving quality indicator (such as SNR, RSSI, or a combination thereof). In step 406, the processing unit 104 filters the single antenna receiving quality indicator by a smoothing filter. The smoothing filter may be, for example, an Infinite Impulse Response (IIR) filter. However, other kinds of smoothing filter may be used as well. In step 408, the processing unit 104 compares the filtered single antenna receiving quality indicator with a predefined threshold. The predefined threshold here refers to a threshold of the filtered single antenna receiving quality indicator in the fading channel. The predefined threshold may vary depending upon a desired implementation. In step 410, the processing unit 104 turns off in base band the corresponding activated antenna if the filtered single antenna receiving quality indicator is smaller than the predefined threshold.

"Turn off in base band" in the context of this disclosure means that a signal from the corresponding antenna is ignored in base band and the corresponding antenna is still working in Radio Frequency (RF). For example, if the filtered single antenna receiving quality indicator for antenna 1 is smaller than the predefined threshold, which means that a signal from antenna 1 is not good enough in quality to improve performance, antenna 1 will be turned off in base band. Similarly, if the filtered single antenna receiving quality indicator for antenna 2 is smaller than the predefined threshold, antenna 2 will be turned off in base band, and so on. In this way, the worse antenna is turned off in base band, and hence performance degradation due to receiving diversity is avoided.

Further, after the receiving diversity is turned on, in step 412, if the filtered single antenna receiving quality indicators of all the activated antennas are larger than or equal to the predefined threshold, the processing unit 104 compares the receiver receiving quality indicator (such as BER, BLER, or a combination thereof) with the first threshold indicated in the method 200. If the receiver receiving quality indicator is smaller than or equal to the first threshold indicated in the method 200, steps 404-410 are performed again for any activated antenna. Otherwise, if the receiver receiving quality indicator is above the first threshold, the processing unit 104 determines in step 414 single antenna receiving quality indicators (such as SNR, RSSI, or a combination thereof) for all the activated antennas and deactivates in step 416 all the activated antennas except one activated antenna whose single antenna receiving quality indicator indicates that it has best receiving quality based on the determined single antenna receiving quality indicators. Steps 414 and 416, similar to steps 202 and 204, will keep only the best antenna on to save power.

Figure 5:
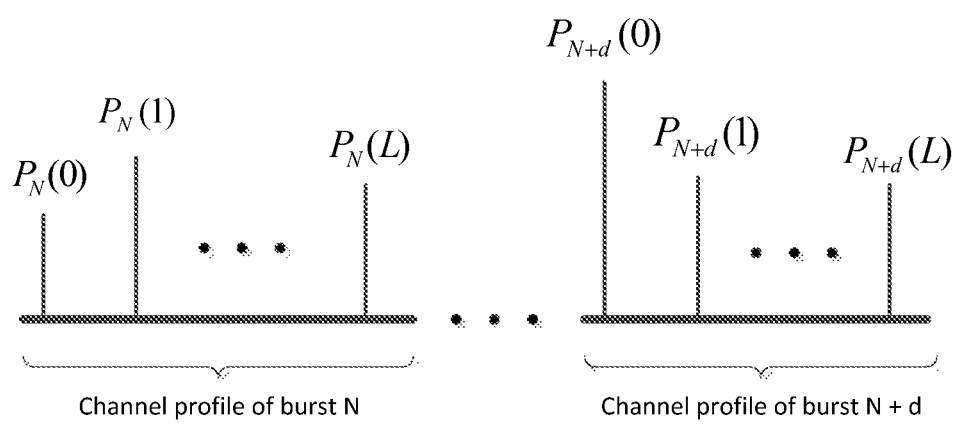
FIG. 5 schematically shows exemplary channel profiles of two bursts with a distance of d bursts in accordance with one aspect of the present disclosure.

In one example, the processing unit 104 uses a correlation coefficient of channel profiles between two bursts to differentiate between the static channel and the fading channel. FIG. 5 shows exemplary channel profiles of two bursts with a distance of d bursts in accordance with one aspect of the present disclosure.

For each burst, a channel profile comes from channel estimation. To guarantee an accuracy of the channel estimation, the better antenna should be used. The channel profile is calculated as:

$$P_k(n) = \|h(n)\|^2, n=0, \ldots, L \tag{1}$$

where $P_k(n)$ represents a channel profile of a burst k, k is a burst index, k is a burst index, h(n) is complex-valued channel estimation, and L is the order of estimated channel impulse response.

Then a correlation coefficient of channel profiles between two bursts with a distance of d bursts is calculated as:

$$CC_{N+d} = \frac{\sum_{i=0}^{L}(P_N(i)-\overline{P_N})(P_{N+d}(i)-\overline{P_{N+d}})}{\sigma_{P_N} \cdot \sigma_{P_{N+d}}} \tag{2}$$

where $CC_{N+d}$ represents a correlation coefficient of channel profiles between two bursts with a distance of d bursts;

$\overline{P_N}$ and $\overline{P_{N+d}}$ are the mean of the channel profile of the $N^{th}$ burst and the mean of the channel profile of the $(N+d)^{th}$ burst respectively;

$\sigma_{P_N}$ and $\sigma_{P_{N+d}}$ are a variance of the channel profile of the $N^{th}$ burst and a variance of the channel profile of the $(N+d)^{th}$ burst respectively.

The parameter d is used to control how "static" the channel is. A bigger d can be used to distinguish a more static channel from a fading channel.

A simulation of correlation coefficients of channel profiles shows that the static channel has a larger correlation coefficient at a big probability, and correlation coefficients do not change a lot with signal level.

As indicated above, the static channel scenario is handled differently from the fading channel scenario. By doing so, the known antenna gain imbalance can be used to decide whether it's worth activating a deactivated antenna when the receiver receiving quality indicator is below the second threshold. Separately handling static channel simplifies the whole controlling process since the threshold for the single antenna receiving quality indicator is different for static and dynamic cases.

The receiving diversity may be dynamically turned on or off based on the receiver receiving quality indicator combined with antenna gain imbalance and the single antenna receiving quality indicator of any antenna. When the receiver receiving quality indicator is very high, only the antenna with the best quality is activated to save power. When the receiver receiving quality indicator is very low, any deactivated antenna may be turned on in RF. After that, the quality of the antenna is checked. If the antenna whose quality is not good enough, it will be bypassed in base band. So receiving diversity will not degrade performance.

Throughout the description and claims, the words "comprise", "include", and variations of the words, for example "comprising" and "comprises", means "including but not limited to", and is not intended to (and does not) exclude other components, integers or steps.

Throughout the description and claims, the singular encompasses the plural unless the context otherwise requires. In particular, where the indefinite article is used, the specification is to be understood as contemplating plurality as well as singularity, unless the context requires otherwise.

It will be understood that the foregoing description of the embodiments of the present invention has been presented for purposes of illustration and description. This description is not exhaustive and does not limit the claimed invention to the precise forms disclosed. Modifications and variations are possible in light of the above description or may be acquired from practicing the present invention. The claims and their equivalents define the scope of the present invention.

What is claimed is:

1. A method for controlling receiving diversity of a receiver, comprising:
   determining single antenna receiving quality indicators for all activated antennas, if a receiver receiving quality indicator of the receiver is above a first threshold;
   deactivating all the activated antennas except one activated antenna with a single antenna receiving quality indicator indicating a best receiving quality based on the determined single antenna receiving quality indicators;
   if the receiver if the receiving quality indicator is below a second threshold smaller than the first threshold in case of a static channel, comparing an antenna gain imbalance of a deactivated antenna with a predefined threshold; and
   activating the deactivated antenna if the antenna gain imbalance is smaller than or equal to the predefined threshold.

2. The method according to claim 1, further comprising:
   comparing the receiver receiving quality indicator with the first threshold.

3. The method according to claim 1, further comprising:
   if the receiver receiving quality indicator is below the second threshold in case of a fading channel, activating all the deactivated antennas;
   for any activated antenna: calculating a single antenna receiving quality indicator;
   filtering the single antenna receiving quality indicator by a smoothing filter;
   comparing the filtered single antenna receiving quality indicator with a predefined threshold; and
   turning off in base band the corresponding activated antenna if the filtered single antenna receiving quality indicator is smaller than the predefined threshold.

4. The method according to claim 3, further comprising:
   if the filtered single antenna receiving quality indicators of all the activated antennas are larger than or equal to the predefined threshold, comparing the receiver receiving quality indicator with the first threshold.

5. The method according to claim 3, wherein a correlation coefficient of channel profiles between two bursts is used to differentiate between the static channel and the fading channel.

6. The method according to claim 5, wherein a channel profile of a burst is calculated as:

$$P_k(n) = \|h(n)\|^2, n=0, \ldots, L$$

where $P_k(n)$ represents a channel profile of a burst k, k is a burst index, h(n) is complex-valued channel estimation, and L is the order of estimated channel impulse response.

7. The method according to claim 6, wherein a correlation coefficient of channel profiles between two bursts with a distance of d bursts is calculated as:

$$CC_{N+d} = \frac{\sum_{i=0}^{L}(P_N(i) - \overline{P_N})(P_{N+d}(i) - \overline{P_{N+d}})}{\sigma_{P_N} \cdot \sigma_{P_{N+d}}}$$

where $CC_{N+d}$ represents a correlation coefficient of channel profiles between two bursts with a distance of d bursts;
   $\overline{P_N}$ and $\overline{P_{N+d}}$ are the mean of the channel profile of the $N^{th}$ burst and the mean of the channel profile of the $(N+d)^{th}$ burst respectively; and
   $\sigma_{P_N}$ and $\sigma_{P_{N+d}}$ are a variance of the channel profile of the $N^{th}$ burst and a variance of the channel profile of the $(N+d)^{th}$ burst respectively.

8. The method according to claim 3, wherein the smoothing filter is an Infinite Impulse Response filter.

9. The method according to claim 1, wherein the receiver receiving quality indicator is a Bit Error Ratio, a Block Error Ratio, or a combination thereof for a fading channel and an antenna gain for a static channel, and the single antenna receiving quality indicator is a Signal-to-Noise Ratio, a Received Signal Strength Indicator, or a combination thereof.

10. The method according to claim 1, wherein the first and second thresholds are selected, and wherein a gap exists between the first and second thresholds to avoid a ping-pong effect.

11. A mobile station comprising:
   a receiver comprising a signal combiner and a plurality of antennas; and
   a processing unit configured to control receiving diversity of the receiver by
      determining single antenna receiving quality indicators for all activated antennas, if a receiver receiving quality indicator of the receiver is above a first threshold;
      deactivating all the activated antennas except one activated antenna with a single antenna receiving quality indicator indicating a best receiving quality based on the determined single antenna receiving quality indicators;
      if the receiver quality indicator is below a second threshold smaller than the first threshold in case of a static channel, comparing an antenna gain imbalance of a deactivated antenna with a predefined threshold; and
      activating the deactivated antenna if the antenna gain imbalance is smaller than or equal to the predefined threshold.

12. The mobile station according to claim 11, wherein the processing unit is further configured to control receiving diversity of the receiver by comparing the receiver receiving quality indicator with the first threshold.

13. The mobile station according to claim 11, wherein the processing unit is further configured to control receiving diversity of the receiver by
if the receiver receiving quality indicator is below the second threshold in case of a fading channel, activating all the deactivated antennas;
for any activated antenna: calculating a single antenna receiving quality indicator;
filtering the single antenna receiving quality indicator by a smoothing filter;
comparing the filtered single antenna receiving quality indicator with a predefined threshold; and
turning off in base band the corresponding activated antenna if the filtered single antenna receiving quality indicator is smaller than the predefined threshold.

14. The mobile station according to claim 13, wherein the processing unit is further configured to control receiving diversity of the receiver by, if the filtered single antenna receiving quality indicators of all the activated antennas are larger than or equal to the predefined threshold, comparing the receiver receiving quality indicator with the first threshold.

15. The mobile station according to claim 13, wherein the processing unit is further configured to use a correlation coefficient of channel profiles between two bursts to differentiate between the static channel and the fading channel.

16. The mobile station according to claim 15, wherein a channel profile of a burst is calculated as:

$$P_k(n) = \|h(n)\|^2, n=0, \ldots, L$$

where $P_k(n)$ represents a channel profile of a burst k, k is a burst index, h(n) is complex-valued channel estimation, and L is the order of estimated channel impulse response.

17. The mobile station according to claim 16, wherein a correlation coefficient of channel profiles between two bursts with a distance of d bursts is calculated as:

$$CC_{N+d} = \frac{\sum_{i=0}^{L}(P_N(i)-\overline{P_N})(P_{N+d}(i)-\overline{P_{N+d}})}{\sigma_{P_N} \cdot \sigma_{P_{N+d}}}$$

where $CC_{n+d}$ represents a correlation coefficient of channel profiles between two bursts with a distance of d bursts;

$\overline{P_N}$ and $\overline{P_{N+d}}$ are the mean of the channel profile of the $N^{th}$ burst and the mean of the channel profile of the $(N+d)^{th}$ burst respectively; and $\sigma_{P_N}$ and $\sigma_{P_{N+d}}$ are a variance of the channel profile of the $N^{th}$ burst and a variance of the channel profile of the $(N+d)^{th}$ burst respectively.

18. The mobile station according to claim 13, wherein the smoothing filter is an Infinite Impulse Response filter.

19. The mobile station according to claim 11, wherein the receiver receiving quality indicator is a Bit Error Ratio, a Block Error Ratio, or a combination thereof for a fading channel and an antenna gain for a static channel, and the single antenna receiving quality indicator is a Signal-to-Noise Ratio, a Received Signal Strength Indicator, or a combination thereof.

20. The mobile station according to claim 11, wherein the first and second thresholds are selected, and wherein a gap exists between the first and second thresholds to avoid a ping-pong effect.

* * * * *